UNITED STATES PATENT OFFICE.

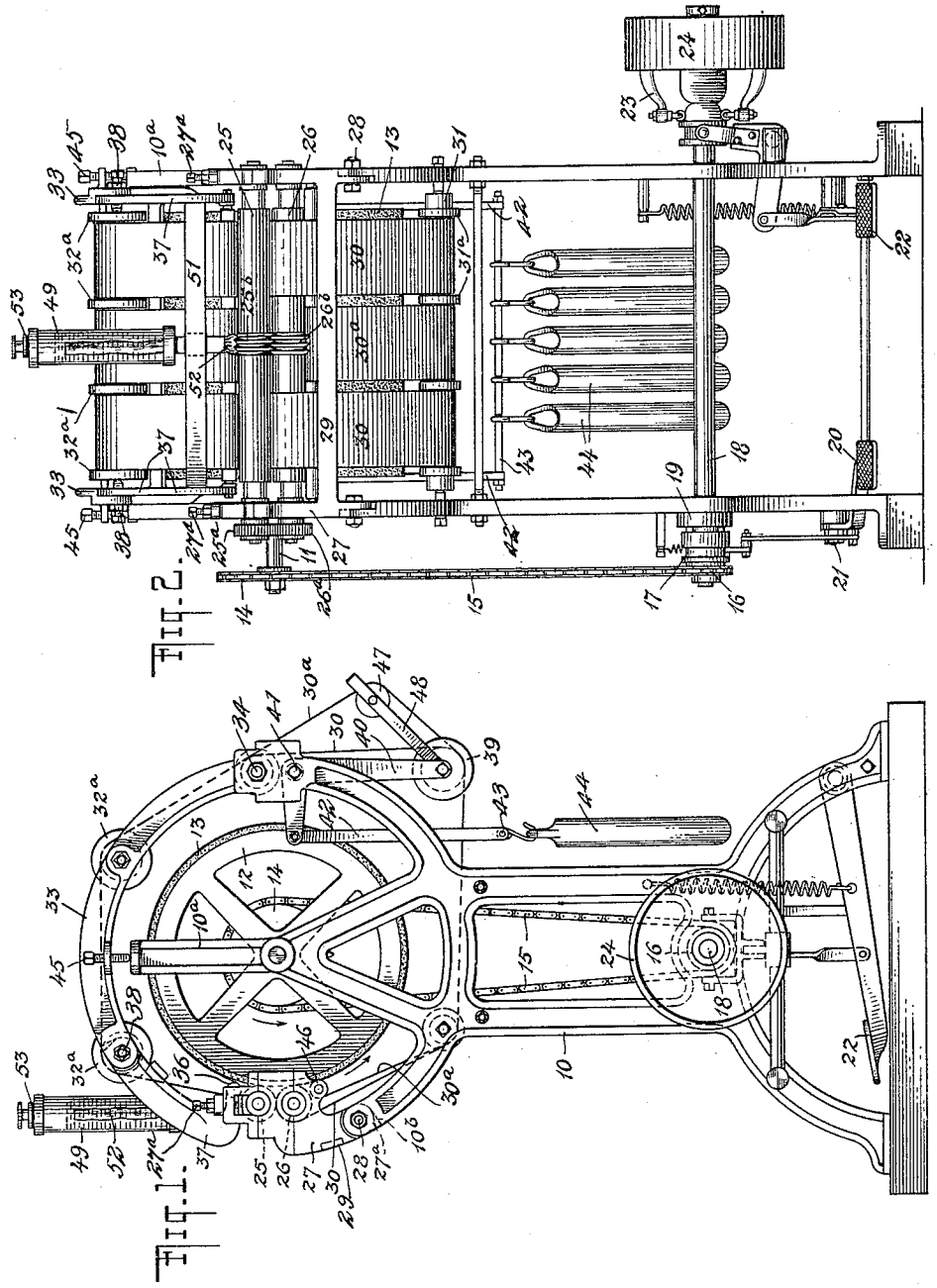
O. HAMMERSTEIN.
TOBACCO LEAF MACHINE.
APPLICATION FILED DEC. 15, 1913.
1,137,207.
Patented Apr. 27, 1915.
2 SHEETS—SHEET 1.
WITNESSES
INVENTOR
OSCAR HAMMERSTEIN
BY
ATTORNEYS

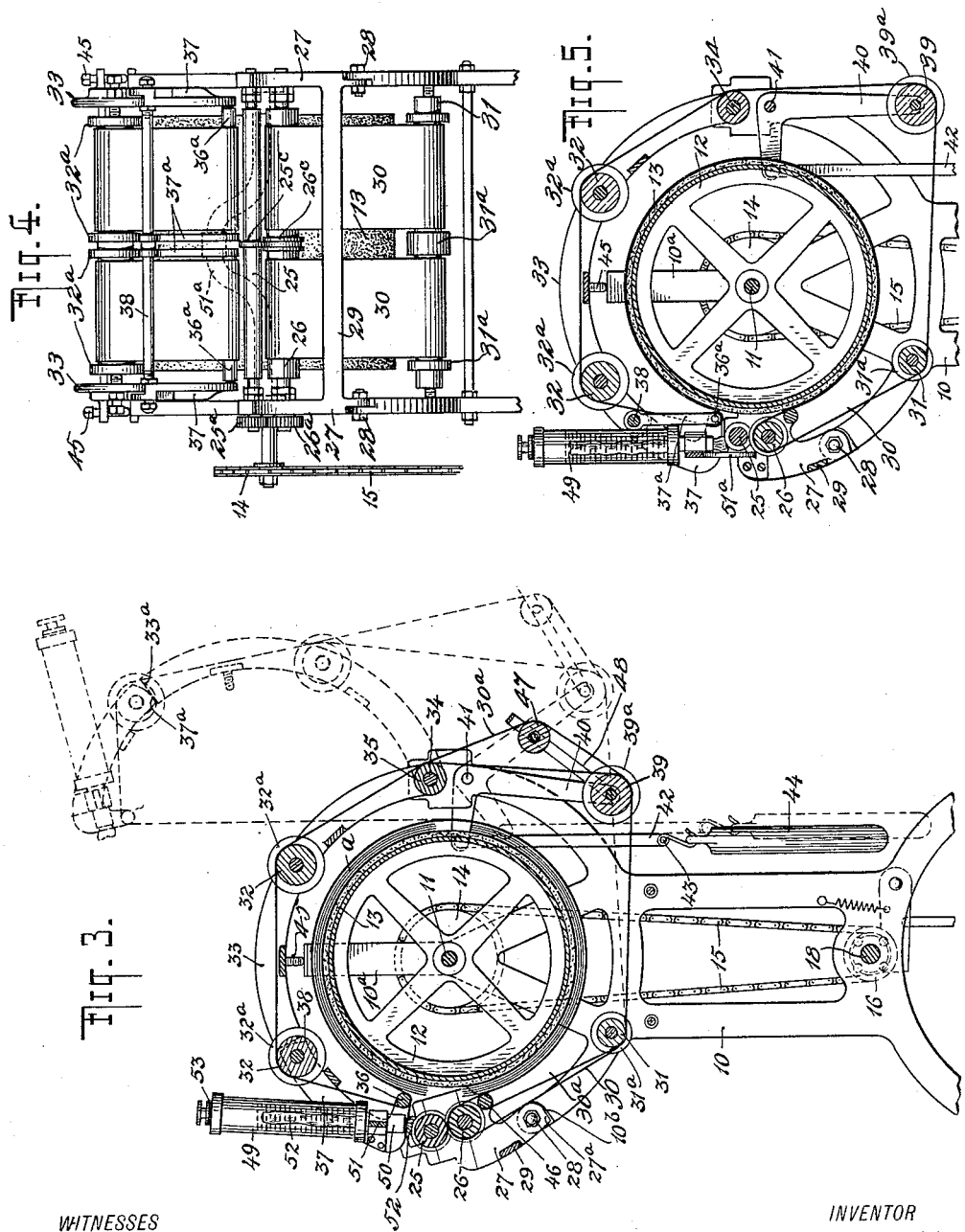

OSCAR HAMMERSTEIN, OF NEW YORK, N. Y.

TOBACCO-LEAF MACHINE.

1,137,207. Specification of Letters Patent. Patented Apr. 27, 1915.

Application filed December 15, 1913. Serial No. 806,661.

*To all whom it may concern:*

Be it known that I, OSCAR HAMMERSTEIN, a citizen of the United States, and resident of the borough of Manhattan, city, county, and State of New York, have invented certain new and useful Improvements in Tobacco-Leaf Machines, of which the following is a specification.

My invention relates to tobacco leaf machines and has for its object to provide a machine of this type which will effectively and continuously book the leaf and which includes an improved and simple mechanism for feeding the said leaf to the booking means.

My improvement further contemplates providing the said feeding mechanism either with a means for treating the stems of the leaf in a manner to render said stems readily combustible and available for use in the manufacture of cigars or with a simple and effective stripping device for stripping said leaf.

My invention will be fully described hereinafter and the features of novelty will be pointed out in the appended claims.

Reference is to be had to the accompanying drawings in which—

Figure 1 is a side elevation of my improved machine; Fig. 2 is a front view thereof showing the stem treating means combined with the feeding mechanism; Fig. 3 is a central vertical section thereof; and Figs. 4 and 5 are detail views similar to Figs. 2 and 3 respectively and showing the stripping means combined with the feeding mechanism.

As illustrated in the drawings the machine comprises a main frame 10 on which a shaft or the like 11, carrying a drum 12, is journaled, said drum 12 being preferably covered with felt or similar cushioning material 13 whereby injury to the tobacco by direct contact with the drum surface during booking is avoided. A sprocket wheel 14 is fixed upon the drum shaft 11 and is connected by means of a sprocket chain 15 with a second sprocket wheel 16 which is secured to or forms part of a clutch member 17 loosely mounted on a driving shaft 18 rotatably mounted on the main frame 10. This clutch member 17 is adapted to coöperate with a cluch member 19 which is fast on the shaft 18, said member 17 being operated by means of a treadle 20 pivoted at 21 on the main frame 10 to connect said clutch members when it is desired to start the machine. The clutch 17—19 is preferably so constructed that it will be automatically disconnected at the end of each complete revolution of the shaft 18 and to remain so until the members thereof are again connected by an operation of the treadle 20. The sprocket wheels 14 and 16 in the illustration are so proportioned that a complete revolution of the shaft 18 will bring about one-half a revolution of the drum 12 which latter thus automatically comes to rest at the end of each half revolution. A second treadle 22 also pivoted on the main frame may be provided for stopping the machine at an intermediate point or at any time before the automatic stoppage spoken of above is accomplished. This treadle 22 when depressed serves to disconnect the normally connected members of a cluch 23, and thus causes the driving pulley 24 to rotate idly on the shaft 18 without exerting any driving function. This condition of the parts remains until the pressure is removed from the treadle 22, an operation which causes the members of the clutch 23 to again become connected and the pulley 24 to be again coupled to the shaft 18.

The means for feeding the tobacco leaf comprises two rollers 25 and 26 rotatably mounted substantially in surface engagement with each other on arms 27 pivoted at 28 on the main frame 10 and rigidly connected together by means of a cross-bar 29. The rollers 25 and 26 are operatively connected together by means of pinions 25ª and 26ª and the roller 25 is preferably mounted so as to be adjustable toward and away from the roller 26, in which case adjusting screws 27ª are provided on the arms 27, it being understood that the adjustment of said rollers is never sufficient to disengage the pinions 25ª and 26ª. As shown best in Fig. 2 the rollers 25 and 26 are each provided at approximately their central points with corrugated or otherwise roughened portions 25ᵇ and 26ᵇ, the said portions being relatively narrow and the remainder of the rollers at opposite sides of said corrugated portions being preferably smooth. A pair of endless belts or aprons 30 pass around the smooth portions of the roller 26 at opposite sides of the corrugated portions 26ᵇ and around the drum 12 with which said belts or aprons coöperate to book the leaf as will be more clearly described hereinafter. The said belts or aprons 30 pass over a guide roller 31 rotatably mounted on the main frame 10 and further pass over guide rollers 32 journaled on an auxiliary frame 33 pivoted at 34 to the main frame 10. If desired a roller 35 may be rotatably mounted on the pivot 34 for still further guiding the said belts or aprons 30. In addition to the above mentioned rollers the said aprons 30 pass around a roller 36 which is journaled on arms 37 pivotally secured at 38 to the auxiliary frame 33 and forming a continuation of the same and with said frame 33 extending about the upper portion of the drum 12 as shown in Figs. 1 and 3. In order that the belts or aprons 30 may at all times be maintained under tension or in proper operative relation to the drum 12, I also conduct the said belts or aprons over a tension roller 39. This tension roller 39 is journaled upon bell crank levers 40 pivoted at 41 upon the main frame 10 and supporting links 42 which in turn form means for supporting a cross-bar 43 from which weights 44 are detachably suspended. As will be readily apparent the said weights tend to rock the bell crank levers 40 on the pivots 41 and thus cause the roller 39 to exert a tension on the said aprons 30. The rollers 31, 32 and 39 are preferably provided with annular flanges 31$^a$, 32$^a$ and 39$^a$ respectively between which the aprons 30 travel and through the medium of which said aprons are maintained in constant paths. In order that the auxiliary frame 33 may be properly supported in operative relation to the drum 12, I provide adjustable screws 45 adapted to rest upon upright portions 10$^a$ of the machine frame 10.

With the feed rollers 25 and 26 provided with corrugated portions 25$^b$ and 26$^b$ the machine is adapted to render the stems readily combustible and to book the leaf in its initial unstripped condition after the stems have been thus treated. In order to properly book the leaf in this conditon I prefer to provide an intermediate belt or apron 30$^a$ which passes over the rollers 31, 32, 35 and 39 and around the roller 36 and drum 12 in the same manner as do the belts or aprons 30 and is located therebetween. This intermediate belt 30$^a$ does not, however, pass around the roller 26 but instead passes around a roller 46 journaled on the arms 27 below said roller 26 and is permitted to have a yielding movement relatively to the aprons 30 under certain conditions to be more fully explained hereinafter by means of an auxiliary tension roller 47 journaled on arms 48 capable of a rocking movement on the shaft of the roller 39. The said roller 47 combined with the weights 44 which control the roller 39 is relied upon to maintain the said intermediate belt 30$^a$ under proper tension at all times. In order that the corrugated portions 25$^b$, 26$^b$ may be kept free and clean and at all times in operative condition when the machine is in use, I prefer to provide a receptacle 49 adapted to contain water or other suitable liquid and supported in an inverted condition in a sleeve 50 forming part of or secured to a cross-bar 51 and connecting the arms 37 as shown best in Fig. 2. The receptacle 49 is provided with a wick 52 which in the operative condition of the machine has its exposed end resting upon or in wiping engagement with the corrugated portion 25$^b$ of the roller 25. The receptacle 49 may be filled in any suitable manner as for instance, through an opening normally closed by a stopper 53.

The operation of the machine so far described is as follows: After the driving shaft 18 has been set in motion through the medium of the pulley 24 and it is desired to start the machine, the treadle 20 is depressed by foot power or otherwise to operatively connect the clutch members 17 and 19, after which said treadle 20 is released and returns to its normal position. The rotative motion of the shaft 18 in this condition of the parts is communicated to the sprocket wheel 16 and by means of the sprocket chain 15 will thus rotate the sprocket wheel 14. This will bring about a rotation of the drum 12 and an actuation of the belts or aprons 30 and 30$^a$, the aprons 30 in turn serving to rotate the roller 26 which latter owing to its connection with the roller 25 through the medium of the gears 25$^a$, 26$^a$ will thus also rotate the roller 25. The tobacco leaf $a$ with the stem remaining therein is introduced between the rollers 25 and 26 with the stem thereof opposite the corrugated or otherwise roughened portions 25$^b$, 26$^b$. The rollers 25 and 26 will cause the leaf to be fed along between them and cause the stem of the leaf to be subjected to the action of the corrugated or otherwise roughened portions 25$^b$, 26$^b$ and its characteristics changed to make said stem readily combustible and available for use in cigars or the like. At any time during the passage of the leaf between the rollers 25 and 26 the operation of the machine may be temporarily checked as before stated by simply depressing the treadle 22, thus giving the operator an opportunity to unfold or straighten out the leaf or otherwise adjust the same for proper feeding between the rollers 25 and 26. By permitting the treadle 22 to resume its normal position the mechanism will again be set in motion and the treated leaf $a$ will pass downwardly between the aprons 30 and 30$^a$ and the felted surface 13 of the drum 12, the stem of the leaf being located adjacent to the apron 30ᵃ and the remainder of the leaf being next to the aprons 30. In this manner the leaf is finally removed from between the rollers 25 and 26 and becomes deposited upon the surface of the drum 12 being held thereon by the aprons 30 and 30ᵃ. After this has been accomplished the movement of the drum will be automatically arrested through the automatic disengagement of the clutch members 17 and 19 as hereinbefore set forth. After the treadle 20 has been again depressed a second leaf may be introduced and fed between the rollers 25 and 26 and will also finally become deposited on the drum 12 in the same manner as the first leaf, the two leaves being located at diametrically opposite points of the drum 12 or in other words, one behind the other as shown best in Fig. 3. A third leaf which may now be introduced between the rollers 25 and 26 will finally become deposited upon the first leaf on the drum, while the following or fourth leaf will become deposited upon the second and so on. Two separate bookings of treated tobacco leaf will in this manner be built upon the drum 12 at diametrically opposite points thereof as will be readily apparent from an inspection of Fig. 3. As the leaf accumulates in the manner described the aprons 30 will be gradually moved away from the periphery of the drum 12, the bell crank levers 40 swinging on the pivots 41 and permitting the said aprons to yield as described. During this operation the apron 30ᵃ will be similarly moved away from the drum by the stem portions of the leaf and as these stem portions are relatively thicker than the remainder of the leaf the bookings will be thicker at these points and the apron 30ᵃ will be at a greater distance from the surface of the drum 12 than are the aprons 30. This independent yielding adjustment of the apron 30ᵃ is possible owing to the fact that the rods 48 and roller 47 are capable of an independent swinging movement on the shaft of the roller 39. At the same time as the bookings increase in thickness a pressure will be exerted thereby and owing to the fact that the axis of the drum 12 is fixed against a transverse movement will cause the arms 27 with the rollers 25 and 26 to be swung on the pivots 28. Similarly the pressure of the bookings will cause the arms 37 to be swung on the pivots 38, the receptacle 49 being carried along during this movement and the wick 52 being thus maintained in proper operative relation to the corrugated portion 25ᵇ as is shown in Fig. 3. During the swinging of the arms 37 as described the said receptacle 49 will properly adjust itself in the sleeve 50 of the bar 51. The feed rollers 25 and 26 thus automatically adjust themselves to accommodate books of any thickness within the range of operation of the machine, the books being at all times firmly held on the drum 12 by the aprons 30 and 30ᵃ and the receptacle 49 similarly accommodating itself to the change in size of the bookings and being at all times in proper operative relation to the corrugated portion 25ᵇ of the roller 25. The pressure exerted by the several aprons under the influence of the weights 44 and roller 47 insure a perfect booking of the leaf which at the same time in the form of machine and book described is treated to render the stems available for use in cigars and thus avoiding the necessity for stripping said leaf. When the desired thickness of booking has been secured the auxiliary frame 33 is raised about the pivot 34 to the position shown in dotted lines in Fig. 3 until arrested either by the aprons 30 and 30ᵃ or by a suitable stop which may be provided on the main frame 10 for this purpose. In this manner the upper portion of the drum is freed and the uppermost book is in consequence free to be easily removed therefrom, after which the drum is given a half rotation to bring the second book into a position of ready accessibility which second book may thus also be readily removed. The auxiliary frame 33 may then again be moved back to its normal position to again make the machine ready for further operation, the various parts automatically adjusting themselves during these manipulations. In order that the arms 37 may be prevented from swinging too far downward when the auxiliary frame is in its raised position the said arms are provided with square or angular ends 37ᵃ adapted to abut against shoulders 33ᵃ formed on said auxiliary frame 33 as is clearly shown in the dotted position in Fig. 3. The arms 27 may similarly be provided with square or angular ends 27ᵃ adapted to engage a shoulder 10ᵇ on the main frame 10 for limiting the outward movement of said arms 27 as is also clearly shown in said Fig. 3.

In Figs. 4 and 5 the rollers 25 and 26 instead of being provided with corrugated or otherwise roughened portions 25ᵇ, 26ᵇ are provided with coöperating cutting devices 25ᶜ, 26ᶜ whereby the stem is cut from the leaf, or the leaf in other words is stripped before being booked. In this form the intermediate apron 30ᵃ may be omitted if desired. The aprons 30 in this second form of machine also instead of passing around a single roller 36 pass around individual rollers 36ᵃ which have their one end rotatably mounted in the arms 37 and their other ends journaled in arms 37ᵃ capable of independent swinging movement about the pivot rod 38. With this construction two pairs of bookings are formed on the drum at diametrically opposite points, each consisting substantially of a half leaf or in other words of opposite side portions of said leaf, this being due to the fact that the stem is cut or stripped from the leaf in its passage between the rollers 25, 26. With the above arrangement, if the bookings adjacent to the left hand belt or apron 30 in Fig. 4 should become thicker than the bookings adjacent to the right-hand belt or apron 30 in said Fig. 4 or vice versa the corresponding arms 37 and 37ᵃ are capable of an independent yielding movement so as to readily accommodate any inequality which may exist in the thickness of the respective bookings. To make this operation readily possible the receptacle 49 which in the present arrangement is intended to maintain the cutters 25ᶜ, 26ᶜ in a clean and operative condition, instead of being mounted on the arms 37, is carried by a cross-bar 51ᵃ which forms part of or is secured to the arms 27. The said receptacle 49 instead of moving with the arms 37 as in the first instance thus moves with the arms 27 as is clearly shown in Fig. 5. Otherwise the arrangement being described may be the same as in the first form illustrated and described. The operation is also exactly the same with the exception that as the leaf is passed between the rollers 25 and 26 the stems thereof are stripped or cut from the leaf and two sets or pairs of bookings are built up on the drum at diametrically opposite points thereof.

Under some conditions the rollers 25 and 26 may simply comprise feed rollers coöperating together to feed either the unstemmed or previously stemmed or stripped leaf to the booking drum 12.

It is, of course, to be understood that the drum 12 may be so proportioned and the machine so otherwise arranged that only a single book in the case of the unstemmed leaf or a single pair of books when the leaf is stripped is built up thereon.

My improved machine is extremely simple in operation and construction and is easily controlled by unskilled labor and is not likely to become disarranged or out of order.

Various changes in the specific forms shown and described may be made within the scope of the claims without departing from the spirit of my invention.

I claim:

1. A machine of the kind described comprising a rotatable booking drum, relatively stationary bearings for said drum and means for feeding tobacco leaf thereto, a movable support for said feeding means whereby the latter is automatically adjustable away from said drum by pressure exerted by the booked leaf as the booking proceeds.

2. A machine of the kind described comprising a stationary frame, a booking drum rotatably mounted thereon, a support movably connected with said frame, a pair of coöperating feed rollers carried by said support, said support and feed rollers being automatically movable away from said drum by pressure exerted by the booked leaf as the booking proceeds and means for actuating said drum and feed rollers.

3. A machine of the kind described comprising a stationary frame, a booking drum rotatably mounted thereon, an apron coöperating with said drum to book the leaf thereon, a pair of supports pivotally connected with said frame, a pair of coöperating feed rollers on one of said supports for feeding the leaf, a guide roller on the other support for guiding said apron, said supports being automatically adjustable whereby the feed rollers and guide roller are moved away from the drum by pressure exerted by the booked leaf as the booking proceeds and means for actuating said drum and feed rollers.

4. A machine of the kind described comprising a stationary main frame, a booking drum rotatably mounted thereon, a support pivotally connected with said main frame, a pair of coöperating feed rollers mounted on said support, an auxiliary frame pivotally connected with said main frame and movable to an inoperative position away from the drum, a second support pivotally connected with said auxiliary frame, a guide roller on said second support, an apron coöperating with said drum to book the leaf and passing around one feed roller and said guide roller, said two supports being automatically adjustable whereby the feed rollers and guide roller are moved away from the drum as the booking proceeds and means for actuating said drum.

5. A machine of the kind described comprising a stationary main frame, a booking drum rotatably mounted thereon, a support pivotally connectetd with said main frame, a pair of coöperating feed rollers mounted on said support, an auxiliary frame pivotally connected with said main frame and movable to an inoperative position away from the drum, a second support pivotally connected with said auxiliary frame, a guide roller on said second support, an apron coöperating with said drum to book the leaf and passing around one feed roller and said guide roller, said two supports being automatically adjustable whereby the feed rollers and guide roller are moved away from the drum as the booking proceeds, means for maintaining said apron under tension at all times and means for actuating said drum.

6. A machine of the kind described comprising a stationary frame, a support pivotally secured thereon, a pair of coöperating feed rollers mounted on said support and provided with relatively narrow coöperating corrugated portions intermediate of their ends and with smooth portions at opposite sides of said corrugated portions, a roller journaled adjacent to said feed rollers, a drum rotatably mounted on said frame, aprons passing around said drum and around the smooth portions of one of said rollers, an intermediate apron between said first aprons passing around said drum and said adjacent roller in registry with said corrugated portions, said aprons coöperating with said drum for booking tobacco, means for permitting a movement of said aprons away from the surface of said drum to accommodate the leaf as the booking proceeds, means for permitting a movement of said intermediate apron away from said drum independently of said other aprons and mechanism for actuating said drum, aprons and rollers.

7. A machine of the kind described comprising a stationary frame, a support pivotally secured thereon, a pair of coöperating feed rollers mounted on said support and provided with relatively narrow coöperating corrugated portions intermediate of their ends and with smooth portions at opposite sides of said corrugated portions, a roller journaled on said frame adjacent to said feed rollers, a drum rotatably mounted on said frame, aprons passing around said drum and around the smooth portions of one of said rollers, an intermediate apron between said first aprons passing around said drum and said adjacent roller in registry with said corrugated portions, said aprons coöperating with said drum for booking tobacco, means for permitting a movement of said aprons away from the surface of said drum to accommodate the leaf as the booking proceeds, means for permitting a movement of said intermediate apron away from said drum independently of said other aprons, mechanism for actuating said drum, aprons and rollers and means for moving a portion of said aprons away from said drum to permit a removal of the books of tobacco.

8. A machine of the kind described comprising a stationary frame, a support pivotally secured thereon, a pair of coöperating feed rollers journaled on said support and provided with relatively narrow coöperating corrugated portions intermediate of their ends and with smooth portions at opposite sides of said corrugated portions, a roller journaled on said frame adjacent to said feed rollers, a drum rotatably mounted on said frame, aprons passing around said drum and around the smooth portions of one of said rollers, an intermediate apron between said first aprons passing around said drum and said adjacent roller in registry with said corrugated portions, said aprons coöperating with said drum for booking tobacco, means for permitting a movement of said aprons away from the surface of said drum to accommodate the leaf as the booking proceeds, means for permitting a movement of said intermediate apron away from said drum independently of said other aprons, mechanism for actuating said drum, aprons and rollers and means for cleaning the corrugated portions of said rollers.

9. In a machine of the kind described, a stationary frame, a booking drum rotatably mounted thereon, a support pivotally connected with said frame, a pair of coöperating rollers journaled on said support and provided with intermediate roughened portions for acting upon the stem of a tobacco leaf, a second support pivoted on said frame, a liquid receptacle carried by said second pivoted support, a wick in said receptacle arranged to have a wiping engagement with the roughened portion of one of said rollers, and mechanism for actuating said drum and rollers.

10. A machine of the kind described comprising a stationary frame, a booking drum rotatably mounted thereon, a support pivotally connected with said frame, a pair of coöperating feed rollers journaled on said support, a second support pivoted on said frame, a guide roller on said second support, an apron coöperating with said drum to book the leaf and passing about one of said feed rollers and about said guide roller, a liquid receptacle carried by one of said pivoted supports, a wick in said receptacle arranged to wipe a portion of said feed rollers and mechanism for actuating said drum and feed rollers.

11. A machine of the kind described comprising a stationary frame, a booking drum rotatably mounted thereon, a support pivotally connected with said frame, a pair of coöperating feed rollers journaled on said support, a liquid receptacle carried by said pivoted support, a wick in said receptacle arranged to wipe a portion of said feed rollers, said supports being automatically adjustable whereby said feed rollers and receptacle are moved away from the drum as the booking proceeds and means for actuating said drum and feed rollers.

12. A machine of the kind described comprising a stationary frame, a booking drum rotatably mounted thereon, a support pivotally secured to said frame, a pair of coöperating feed rollers carried by said support, independently movable arms pivotally mounted on said frame, guide rollers connecting said arms in pairs and journaled thereon, a pair of aprons passing about said drum and said guide rollers and coöperating with the latter to book the leaf, said support being automatically adjustable whereby the feed rollers are moved away from the drum as the booking proceeds and said guide rollers being adjustable away from said drum independently of said feed rollers and of each other during the booking operation and means for actuating said drum.

In testimony whereof, I have hereunto set my hand in the presence of two subscribing witnesses.

OSCAR HAMMERSTEIN.

Witnesses:
 JOHN A. KEHLENBECK,
 M. H. LOCKWOOD.

Copies of this patent may be obtained for five cents each, by addressing the "Commissioner of Patents, Washington, D. C."